United States Patent
Kowalewski

(10) Patent No.: US 7,286,590 B1
(45) Date of Patent: Oct. 23, 2007

(54) METHOD FOR THE TRANSMISSION OF DATA, AND APPARATUS FOR THE TRANSMISSION OF DATA

(75) Inventor: Frank Kowalewski, Salzgitter (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/674,022

(22) PCT Filed: Apr. 15, 1998

(86) PCT No.: PCT/DE99/01121

§ 371 (c)(1),
(2), (4) Date: Feb. 14, 2001

(87) PCT Pub. No.: WO99/56441

PCT Pub. Date: Nov. 4, 1999

(30) Foreign Application Priority Data

Apr. 24, 1998 (DE) ................ 198 18 215

(51) Int. Cl.
*H04B 1/00* (2006.01)

(52) U.S. Cl. ...................... 375/141

(58) Field of Classification Search .......... 375/141, 375/145, 146, 242, 253, 254, 285, 295, 260, 375/130, 140, 259; 370/209, 335, 342, 441, 370/208, 203, 329, 328, 310; 341/143, 126; 455/562.1, 561, 442.1, 403, 550.1, 73
See application file for complete search history.

(56) References Cited

U.S. PATENT DOCUMENTS 5,822,359 A * 10/1998 Bruckert et al. ........... 375/145
6,084,919 A * 7/2000 Kleider et al. ............. 375/285

FOREIGN PATENT DOCUMENTS

| CN | 1115554 | 1/1996 |
|---|---|---|
| DE | 196 16 829 | 4/1997 |
| DE | 196 23 667 | 2/2003 |
| EP | 0 674 451 | 9/1995 |
| EP | 717 505 | 6/1996 |
| EP | 866 567 | 9/1998 |
| FI | 941072 | 9/1995 |
| WO | WO 97/01226 | 1/1997 |

OTHER PUBLICATIONS

A. Klein et al., "Zero forcing and minimum mean-square-error equalization for multiuser detection in code-division-multiple-access channels," IEEE Transactions on Vehicular Technology, vol. 45, No. 2, pp. 276-287 (May 1996).
Rapajic, Vucetic, "Linear adaptive transmitter-receiver structures for asynchronous CDMA systems," European Transactions on Telecommunications and Related Technologies, vol. 6, No. 1, pp. 21-27 (Jan. 1995).
Xiaodong Wang, Poor, "Blind equalization and multiuser detection in dispersive CDMA channels," IEEE Transactions on Communications, vol. 46, No. 1, pp. 91-103 (Jan. 1998).

* cited by examiner

*Primary Examiner*—Pankaj Kumar
(74) *Attorney, Agent, or Firm*—Kenyon & Kenyon LLP

(57) ABSTRACT

A method and a system are described for the transmission of data between one base station and several mobile stations via radio channels, the data streams each differing in terms of a code. In a modulator, a pre-equalization of the signals is performed in which the transmission properties of all the radio channels and the different codes of all the radio channels are taken into account.

9 Claims, 2 Drawing Sheets

METHOD FOR THE TRANSMISSION OF DATA, AND APPARATUS FOR THE TRANSMISSION OF DATA

FIELD OF THE INVENTION

The present invention relates to a system and a method for transmitting data. An article by A. Klein, G. K. Kaleh, and P. W. Baier: "Zero Forcing and Minimum Mean-Square-Error Equalization for Multiuser Detection in Code-Division Multiple-Access Channels," IEEE Trans. Vehic. Tech., Vol. 45 (1996), 276-287 describing methods which take into account inter-symbol interferences (ISI) between data symbols of a user, and multiple-access interferences (MAI), i.e., interferences due to other users, in a receiver for radio data. All interferences affecting the transmission are thus taken into account at the receiver. When methods of this kind are used in mobile telephone systems or mobile radio systems, the individual mobile stations are very complex, since this method makes severe technical demands on the receiver.

SUMMARY

A method and an apparatus according to the present invention have an advantage that all interferences that can occur as a result of the radio transmission are taken into account at the transmitter. The receiver of the data can be of a particularly simple design.

This is advantageous for the transmission of data from one base station to a plurality of mobile stations. For the return transmission, it is then possible to use a method or an apparatus that takes all interferences into account at the receiver end, so that the individual mobile stations of a mobile telephone system can be of a particularly simple design. The method and apparatus according to the present invention can, however, also be used for data transmission from mobile stations to base stations. Measurement of the transmission quality or channel pulse response is accomplished easily in the base station, and optionally can be distributed from there.

DESCRIPTION

Figure 1:
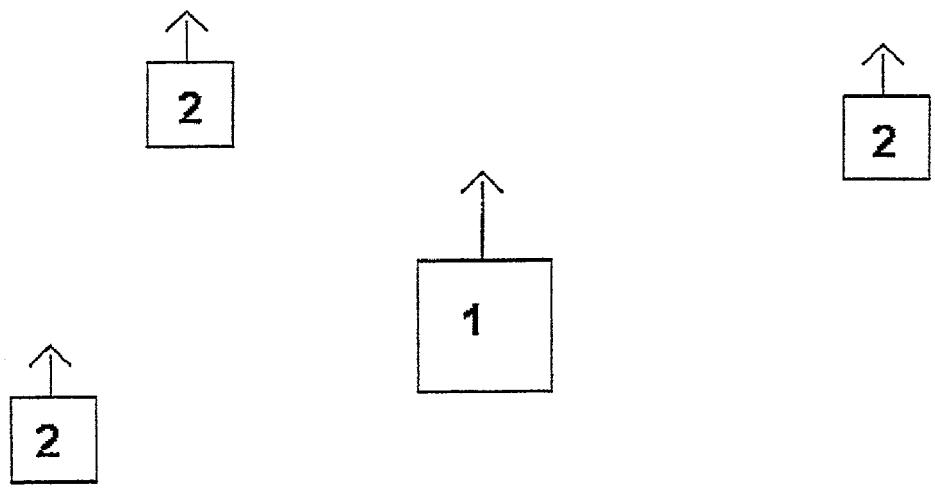
FIG. 1 shows a representation of a mobile radio system or mobile telephone system according to the present invention.

FIG. 1 schematically depicts a radio cell of a cellular mobile telephone system or mobile radio system, with a base station 1 and several mobile stations 2. An exchange of data occurs only between base station 1 and mobile stations 2, and no direct data exchange among mobile stations 2 is possible. Correspondingly, base station 1 is also referred to as the central station, and mobile stations 2 as peripheral stations. The exchange of data between base station 1 and mobile station 2 is accomplished by radio transmission. The radio transmission from base station 1 to a mobile station 2 is referred to as the downlink, and the data transmission from a mobile station 2 to the base station 1 as the uplink. In a system as illustrated in FIG. 1, with one central or base station 1 and several peripheral or mobile stations 2, a definition must be made as to how the data for the various mobile stations are modulated so that they can be separately detected in the receivers of the various mobile stations. The system shown in FIG. 1 is a CDMA (Code Division Multiple Access) system, for example in which one common frequency band is available for data transmission and the individual data channels between base station 1 and the respective mobile stations 2 differ in terms of a code with which the signal for the corresponding mobile station 2 is spread. As a result of this spreading with the code, each signal that is to be exchanged between base station 1 and a specific mobile station 2 is distributed over the entire available spectrum. Each individual information bit that is to be transmitted is broken down into a plurality of small "chirps". As a result, the energy of a bit is distributed over the entire frequency spectrum available to the CDMA system.

Figure 2:
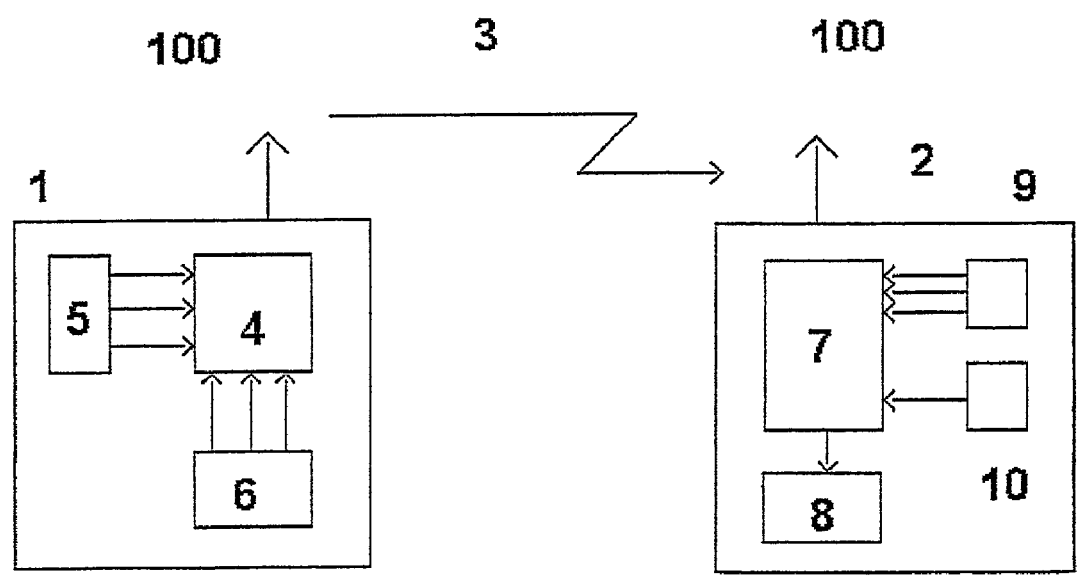
FIG. 2 shows a base station and a mobile station in a downlink transmission.

In FIG. 2, conventional systems are explained in more detail with reference to a downlink transmission. FIG. 2 shows a base station 1 and a mobile station 2, each of which has an antenna 100. Here the two stations are exchanging data via a downlink radio channel 3. Base station 1 has a modulator 4 which prepares the data streams of data sources 6 for transmission via radio channel 3. For this, modulator 4 also requires code data that are made available by a code generator 5. As an example, FIG. 2 shows three arrows from data sources 6 to modulator 4, and three arrows from code generator 5 to modulator 4, representing three different data streams and three different code data. In real systems, a substantially greater number of data streams and code data are processed simultaneously.

From the data streams and the code data, modulator 4 generates a transmitted signal which is sent to all mobile stations 2. FIG. 2 depicts, as an example, only one receiving mobile station 2. In the case of a single mobile station 2 with a single data stream, one code datum would be needed in base station 1. As a rule, however, base station 1 transmits simultaneously over several radio channels 3 to several mobile stations 2 whose respective data are modulated with different codes. For reasons of simplicity, the further mobile stations 2 are not depicted in FIG. 2.

A plurality of interferences occur in the transmission via radio channel 3. A first interference is referred to as "inter-symbol interference" (ISI), and results because an emitted radio signal can reach the receiver via several different paths with slight differences in arrival time at the receiver. This is therefore an interference that occurs in the relevant radio channel because signals emitted earlier in time interfere with signals presently being received (hence "inter-symbol interference"). A further interference occurs because several data streams which differ only in terms of their code are being transmitted simultaneously. This interference occurs if base station 1 is simultaneously in radio contact with several mobile stations 2, which represents the usual case with modern mobile telephone systems. This is thus an interference that results from signals of different users, and is therefore also referred to as "multiple-access interference" (MAI).

FIG. 2 shows the receiving section of a mobile station 2 that is intended for the reception of downlink data via radio channel 3. Provided for this purpose is a demodulator 7 that processes the radio signals received via antenna 100. Demodulator 7 processes the received signals in order to generate from them a data stream for a data user 8. If the transmitted data represent, for example, voice data, then user 8 is a voice decoder; with other data it is, for example, a computer or fax device. Mobile stations generally have a single data user 8 and a single data stream. If the transmission via radio channel 3 were completely without interference, demodulator 7 would need, for demodulation, to know only the code datum of the data to be detected for user 8. Because of the interferences described above, however, this is not sufficient. What is needed in order to take into account ISI is a channel estimator 10 that makes information about transmission properties, i.e., the channel pulse response of radio channel 3, available to the relevant mobile station 2. To compensate for MAI, mobile station 2 must additionally know all the codes used in the base station. A code generator 9 that makes available not only the code datum for the data to be detected here, but also code data for all the codes used in the system, is provided for that purpose. This method is also referred to as "joint detection." The mobile stations that are designed in this fashion for the reception of data from base station 1 are relatively complex.

Figure 3:
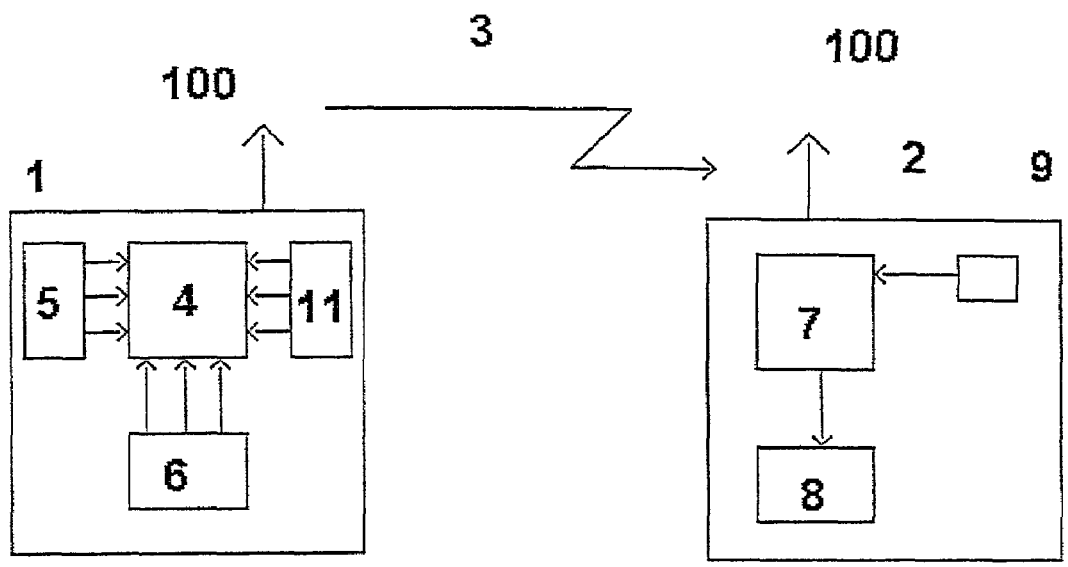
FIG. 3 shows data transmission from a base station to a mobile station according to the present invention.

The method and apparatus according to the present invention will now be explained in more detail with reference to FIG. 3, which also shows the downlink transmission from one base station 1 to a mobile station 2. In FIG. 3, base station 1 again has a modulator 4 that generates the transmitted signals for an antenna 100 of base station 1. Modulator 4 obtains from data sources 6 several data streams which are spread with code data of a code generator 5. Additionally provided is a channel estimator 11 that makes available information about the transmission properties of all radio channels 3. In this instance modulator 4 generates a transmitted signal which takes into account both ISI and MAI. The transmitted signal is designed in each case so that upon reception (to the extent it is possible), each of mobile stations 2 receives an interference-free signal. Both the interferences resulting from the simultaneous use of multiple codes, and the interferences resulting from the transmission properties of the individual radio channels, are thereby taken into account. In FIG. 3, the receiver of the data configured by mobile station 2 is then correspondingly simple. It has a demodulator 7 that receives the signal from antenna 100. All that needs to be made available to this demodulator 7, from a code generator 9, is the code datum for the relevant data stream, from which demodulator 7 then generates the data stream for data user 8. The mobile stations in this instance are thus of particularly simple configuration.

FIG. 3 depicts the fact that in the case of a downlink transmission, all interferences affecting the radio channel are taken into account in the transmitting station, i.e., in the base station in the case of a downlink transmission. The downlink section of mobile station 2 can therefore be of particularly simple configuration. In order to make mobile station 2 simple for the uplink path as well, i.e., for the transmission of data from mobile station 2 to base station 1, it is possible to use for this transmission the method illustrated in FIG. 2, in which ISI and MAI are taken into account in the receiving station, i.e., once again in the base station. A system thus is possible in which the mobile stations are of particularly simple configuration, since ISI and MAI are taken into account exclusively in the base station. In a corresponding TDD system, it is also very easy to obtain the channel transmission properties by way of channel estimator 11 in base station 1, by the fact that the properties of the respective transmission channels can be ascertained by analyzing the received uplink data in the base station. Furthermore, the channel pulse response or channel quality can also be transferred via a data telegram from the mobile station to the base station.

Figure 4:
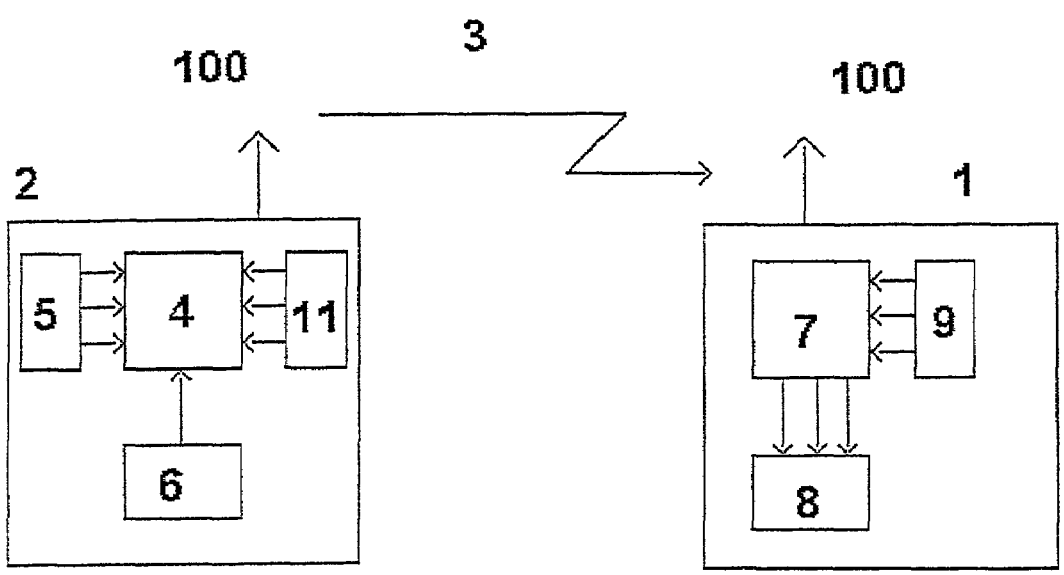
FIG. 4 shows data transmission from a mobile station to a base station according to the present invention.

The method according to the present invention can also be used to send data from mobile station 2 to base station 1. This is depicted in FIG. 4. Here mobile station 2 is depicted in an uplink, i.e., with modulator 4 which is preparing a data stream of a data source 6. In order to take into account the transmission properties of all radio channels 3 and codes used in the system, a code generator 5 is provided which transfers to demodulator 4 the code data of all the codes used in the system, along with a channel estimator 11 which supplies the transmission properties of all the radio channels. The information concerning the transmission properties of all the channels could be made available to mobile station 2 by base station 1. In modulator 4, the interferences due to multipath transmission on radio channel 3 and due to simultaneous transmission of several data streams are taken into account when the radio signal is generated. The radio signal is sent via antenna 100 and radio link 3 to base station 1. Base station 1 receives not only the data of mobile station 2 shown in FIG. 4, but simultaneously also the radio signals of other mobile stations (not depicted in FIG. 4). Demodulator 7 of base station 1 correspondingly has all the code data fed to it from code generator 9, and decodes several data streams for several data users 8. Here, however, it is no longer necessary to provide a channel estimator for decoding.

The method with which the transmission properties of all radio links (ISI) and the codes of all radio links (MAI) are taken into account is described below by way of mathematical formulas. These formulas can be executed either by way of a corresponding program or by corresponding hardware modules which implement these formulas.

What is claimed is:

1. A method for transmitting data between a base station and mobile stations via radio channels, comprising the steps of:
   spreading data of different mobile stations with different codes; and
   performing, in a modulator, a pre-equalization of signals to be transmitted, the pre-equalization taking into account all of the different codes and transmission properties of the radio channels, including radio channel interference corresponding to at least one of intersymbol interference and multiple access interference;
   wherein the data is transmitted between the base station and the mobile stations, and
   wherein the intersymbol interference and the multiple access interference are exclusively accounted for in the base station.

2. The method according to claim 1, further comprising the step of:
   transmitting the data from the base station to the mobile stations.

3. The method according to claim 1, further comprising the step of: transmitting the data from the mobile stations to the base station.

4. The method according to claim 1, further comprising the step of:
   ascertaining, via the base station, the transmission properties of the radio channels from data transmissions from the mobile stations to the base station.

5. An apparatus for transmitting data via at least one radio channel, the apparatus being used in a system that couples a base station and mobile stations via radio channels, the data of different mobile stations being spread with different codes, comprising:
   a modulator;

a code generator coupled to the modulator, the code generator providing all of the different codes; and a channel estimator coupled to the modulator, the channel estimator providing transmission properties of all of the radio channels, wherein the modulator performs a pre-equalization of signals to be transmitted, the pre-equalization being based on information received from the code generator and the channel estimator, and the pre-equalization taking into account radio channel interference corresponding to at least one of intersymbol interference and multiple access interference, and wherein the data is transmitted between the base station and the mobile stations, and wherein the intersymbol interference and the multiple access interference are exclusively accounted for in the base station.

6. The apparatus according to claim 5, wherein the data is transmitted from the base station to the mobile stations.

7. The apparatus according to claim 5, wherein the data is transmitted from the mobile stations to the base station.

8. A system for transmitting data via at least one radio channel, comprising:

a base station; and mobile stations coupled with the base station via radio channels, the data of different mobile stations being spread with different codes, wherein one of (A) the base station and (B) each of the mobile stations includes:

a modulator, a code generator coupled to the modulator, the code generator providing all of the different codes, and a channel estimator coupled to the modulator, the channel estimator providing transmission properties of all of the radio channels, the modulator performing a pre-equalization of signals to be transmitted, the pre-equalization being based on information received from the code generator and the channel estimator, and the pre-equalization taking into account radio channel interference corresponding to at least one of intersymbol interference and multiple access interferences wherein the data is transmitted between the base station and the mobile stations, and wherein the intersymbol interference and the multiple access interference are exclusively accounted for in the base station.

9. The system according to claim 8, wherein the base station ascertains the transmission properties of the radio channels from data transmissions from the mobile stations to the base station.

* * * * *